United States Patent [19]
Schulz et al.

[11] Patent Number: 4,752,386
[45] Date of Patent: Jun. 21, 1988

[54] FILTER APPARATUS HAVING FILTER ELEMENTS SHIFTABLE BETWEEN FILTERING AND BACKWASHING POSITIONS

[75] Inventors: Helmut Schulz, St. Florian; Helmut Bacher, Puchenau; Georg Wendelin, Linz, all of Austria

[73] Assignee: Erema Engineering-Recycling, Austria

[21] Appl. No.: 878,464

[22] Filed: Jun. 25, 1986

[51] Int. Cl.⁴ .................. B01D 29/02; B01D 29/24; B01D 29/38
[52] U.S. Cl. .................. 210/108; 210/232; 210/329; 210/333.1; 425/199
[58] Field of Search ............ 210/108, 234, 329, 333.1, 210/340, 341, 236, 241, 137, 232; 425/198, 199, 197

[56] References Cited
U.S. PATENT DOCUMENTS

| | | | |
|---|---|---|---|
| 913,768 | 3/1909 | Roberts | 210/329 |
| 4,082,487 | 4/1978 | Rapp | 425/199 |
| 4,167,384 | 9/1979 | Shirato et al. | 425/199 |
| 4,597,870 | 7/1986 | Lambertus | 210/341 |

Primary Examiner—Richard V. Fisher
Assistant Examiner—Linda Sue Evans

[57] ABSTRACT

A filter apparatus, particularly for filtering extruded thermoplastic synthetic plastics material, has a housing, within which two carrier members are shiftably arranged, each of which carries a sieve means consisting of two filter sieves. The material to be filtered is supplied to the entry side of the sieve means via an inlet passage. Within each carrier member there is provided a rinsing passage being in connection with the outlet side of the sieve means. The rinsing passage can be connected with the outlet passage when shifting the carrier member into a rinsing position. In this rinsing position, the entry side of the sieve means is at least partially connected with a space receiving the sieve contaminations or opens into atmopshere, respectively.

7 Claims, 2 Drawing Sheets

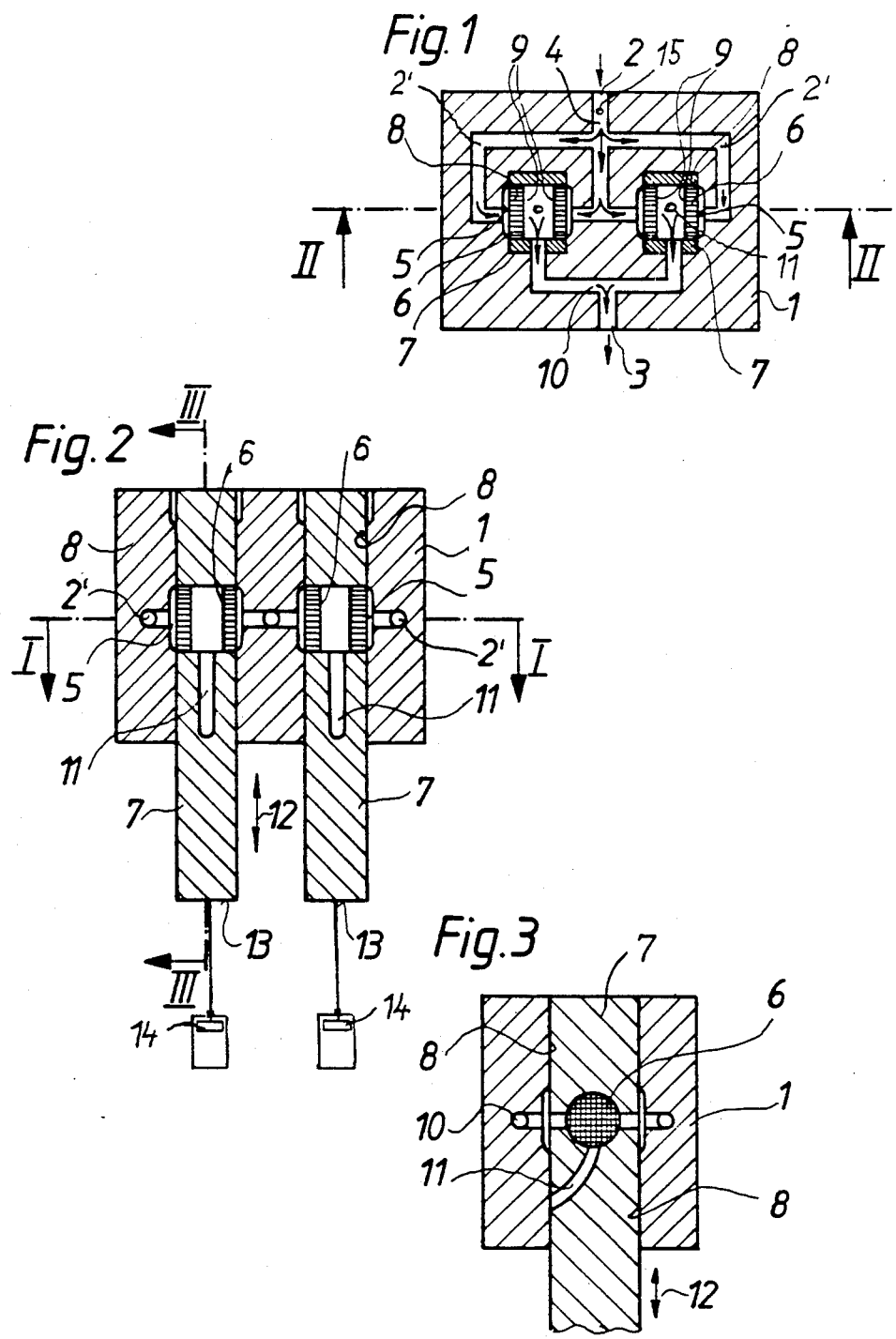

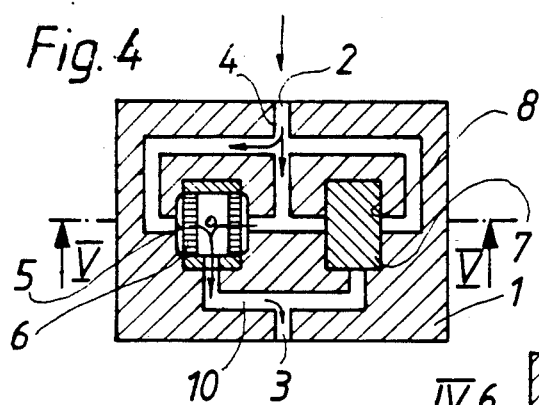
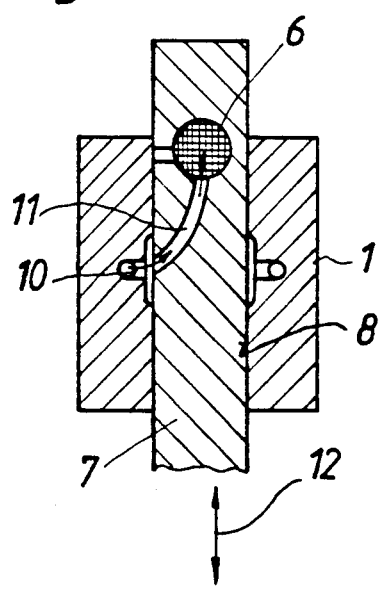
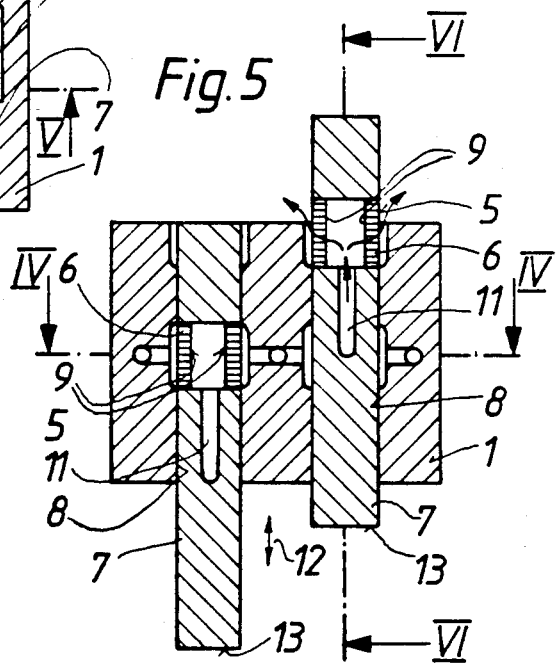
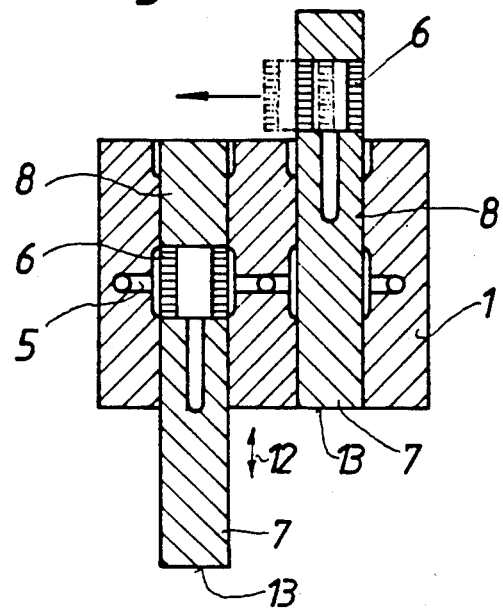

FILTER APPARATUS HAVING FILTER ELEMENTS SHIFTABLE BETWEEN FILTERING AND BACKWASHING POSITIONS

BACKGROUND OF THE INVENTION

The invention refers to a filter apparatus, particularly for a device for extruding thermoplastic synthetic plastics material, comprising a housing having at least one inlet passage being in connection with an inlet opening for the supply of the material to be filtered and having at least one outlet passage being in connection with an outlet opening for discharging the filtered material and having slideably arranged therein at least two carrier members, each of which carries a sieve means through which in operating position of the carrier member the material to be filtered passes from the inlet side, which is connected to the inlet passage, of the sieve means to the outlet side opening into the outlet passage.

In particular when producing thin-walled articles of thermoplastic synthetic plastics material, the melt of synthetic plastics material expelled by the extruder must be filtered for obtaining a perfect product. As a rule, filtering is effected by means of a perforated plate arranged between the extruder screw and the extruder nozzle and by means of a sieve arrangement arranged in front of the perforated plate as seen in flow direction of the extruded melt of synthetic plastics material.

When recycling waste of synthetic plastics material in the extruder it is necessary due to the higher contamination content, to clean and/or to interchange the contaminated sieve arrangement during the extrusion process. Various devices are known for this purpose.

DESCRIPTION OF THE RELATED ART

There has, for example, already been proposed to provide for a plurality of sieve arrangements within a carrier member which is disposed shiftably in transferse direction to the flow direction of the material to be filtered. The carrier member can be linearly shifted or may consist of a rotatable turret. As soon as one sieve arrangement has become contaminated, this sieve arrangement is substituted by a new sieve arrangement by sliding or rotating, respectively, the carrier member. There results, however, the drawback that during the interchange of the sieve arrangements the flow of the melt is interrupted and that during such an interruption an undesired pressure rise is caused within the flow passage upstream of the sieve arrangement.

In a further known device of the initially described type two sieve arrangements are parallely disposed within the pressure passage, so that an interchange of the contaminated sieve arrangement is effected successively, always at least one sieve arrangement remaining in the operative position. This enables one to avoid a complete interruption of the flow of the melt, but an undesired pressure rise within the flow passage upstream of the sieve arrangement occurs also in this device.

In order to avoid such an undesired pressure rise to a great extent, it has already been proposed to provide four sieve arrangements, always two sieve arrangements being parallely disposed within the flow passage. Each of said both sieve arrangements is located in common with a further sieve arrangement on a carrier body, so that, when shifting the carrier body, a contaminated sieve arrangement is immediately substituted by the other sieve arrangement located on the common carrier member. It is a drawback of this device that four sieve arrangements result in a great constructive expenditure.

It has also been proposed to provide two parallel flow passages comprising sieve arrangements and to provide upstream the sieve arrangement a multichannel slide valve. When switching over this multichannel slide valve, the material to be filtered is passed in opposite direction for a short time interval through one of said both sieve arrangements, so that the contaminations deposited on the entry side of this sieve arrangement are lifted off and are discharged via a separate passage. However, the provision of a separate multichannel slide valve is disadvantageous. Above all, the sieve arrangements of this known device can only be interchanged after having stopped the operation. In case of heavy contamination, cleaning of the sieve arrangements by a counter-current process is insufficient and the sieves therefore must be interchanged.

SUMMARY OF THE INVENTION

It is therefore an object of the present invention to avoid the drawbacks of the known constructions and to provide a filter which provides the possibility to clean the sieve means in a constructively simple manner.

It is a further object of the present invention to provide for a construction in which an interchange of the sieve means is possible without interrupting the operation of the apparatus having incorporated the filter.

The invention is based on a filter of the initially described type and essentially consists in that in each carrier member there is arranged a rinsing passage being in connection with the exit side of the sieve means provided in this carrier member, which rinsing passage can be connected with the outlet passage when shifting the carrier member into a rinsing position, noting that in this rinsing position of the carrier members the inlet side of the sieve means is at least partially in connection with a space receiving the contaminations of the sieve or, respectively, opens into the atmosphere. The construction according to the invention provides the possibility to move the carrier member only by shifting same from the operating position into a further position, namely into the rinsing position, in which on account of the particular design of the filter according to the invention cleaning of the sieve means located on this carrier member is effected in a counter-current, which means that during such cleaning part of the melt having been filtered by the other sieve means is pressed through the sieve means from its exit side, so that the contaminations located at the entry side of this sieve means are lifted off this entry side and are conveyed into a space receiving these contaminations or, respectively, may flow into the free atmosphere, or are fed off in any desired manner. The sieve arrangement according to the invention thus requires no separate multichannel slide valve causing, when being operated, reversal of the flow direction in one sieve means via additional flow passages, and it is only necessary to provide within the carrier member one single rinsing passage, reversal of the flow direction being caused by shifting the carrier member only.

A particularly simple embodiment of the invention results if each carrier member is slideably supported in a recess being open at least at one side of the housing, noting that in the rinsing position the sieve means protrudes at least partially from the housing, so that the surroundings of the housing form the space receiving the sieve contaminations.

As already mentioned, the present invention provides also the possibility to interchange the sieve means in a simple manner without having to interrupt the apparatus having arranged therein the filter according to the invention. For this purpose, according to a further development of the invention, each carrier member is shiftable beyond the rinsing position into a position in which the sieve means is arranged as a whole outside of the housing and can thus be easily dismantled and be substituted by a fresh sieve means.

According to a further feature of the invention, each carrier member is arranged within a recess being open at both opposite sides of the housing and is connected at one of its front ends with a piston actuated by a pressurized fluid and causing shifting movement of this carrier member. This shifting movement can automatically be controlled if, according to the invention, a pressure sensor controlling the supply of pressurized fluid to the piston is provided within the inlet passage, so that, in case of any contamination of the sieve arrangements causing a pressure rise within the inlet passage, pressurized fluid is successively supplied to the individual pistons and one carrier body after each other is brought into the rinsing position.

BRIEF DESCRIPTION OF THE DRAWINGS

In the accompanying drawings, the invention is schematically represented by way of an exemplary embodiment.

The FIGS. 1 to 3 show the filter according to the invention with the carrier members assuming the operating position, noting that FIG. 1 shows a section along line I—I in FIG. 2, FIG. 2 shows a section along line II—II in FIG. 1 and FIG. 3 shows a section along line III—III in FIG. 2.

The FIGS. 4 to 6 show the filter according to the invention with one of both carrier members assuming the rinsing position.

FIG. 4 again shows a section along line IV—IV in FIG. 5,

FIG. 5 shows a section along line V—V in FIG. 4 and

FIG. 6 shows a section along line VI—VI in FIG. 5.

FIG. 7 shows a view analogous to that of FIGS. 2 or 5, with one of both carrier member assuming a position allowing an interchange of the sieve means.

BRIEF DESCRIPTION OF THE PREFERRED EMBODIMENT

The filter apparatus according to the invention has a housing 1 being provided with an inlet opening 2 for the material to be filtered and with an outlet opening 3 for the filtered material. The inlet opening 2 is continued by an inlet passage 4 which, in operating position, is in connection, via flow passages 2', with the inlet sides 5 of sieve means 6 consisting of a twin filter or a sieve pair, respectively, comprising two sieves disposed parallel to and spaced apart from each other. Each of said both sieve means 6 is arranged within a carrier member 7 and each carrier member 7 is slideably supported within a recess 8, which is open at mutually opposite sides of the housing 1. In operating position, the outlet side 9 of the sieve means 6 is in connection with the outlet opening 3 of the housing 1 via an outlet passage 10. In the operation position, shown in the FIGS. 1 to 3, of the sieve means 6 or the carrier members 7, respectively, the material to be filtered flows through both sieve means 6 in parallel direction.

As can be taken from FIG. 3, a rinsing passage 11 provided in each carrier member 7 is in connection with the outlet side 9 of the sieve means 6 located within this carrier member, said rinsing passage being, however, closed in operating position by the wall of the recess 8.

Each of both carrier members 7 can be shifted in direction of the twin arrow 12 by means of a piston 14 being actuated by a pressurized fluid and having its piston rod positively connected to the front side 13 of the carrier member 7. Supply of pressurized fluid to the piston can be controlled in a manner known per se by a pressure sensor 15 provided in the inlet passage 4, the pressure sensor causing in case of a pressure rise within the inlet passage 4 at first a shifting movement of the one carrier member 7 for starting rinsing or cleaning of the sieve means arranged on this carrier member and causing, after such rinsing, shifting movement of the other carrier member 7 for the purpose of rinsing or cleaning the sieve means arranged on this carrier member. Such a pressure rise within the inlet passage 4 occurs if on account of a contamination of the sieve means the flow rate within these sieve arrangements is reduced.

In FIGS. 4 to 6 there is now shown the rinsing position that carrier member 7 is in or, respectively, sieve means 6 arranged on this carrier member which is shown at the right side of the drawing. In this rinsing position, there is established a connection between the rinsing passage 11 and the outlet passage 10, so that the outlet side 9 of the sieve means 6 shown at the right-hand side of the drawing is subjected to the action of already filtered material via the rinsing passage 11, whereas the connection between the inlet side 5 with the outlet passage 4 is interrupted. As can be taken from FIG. 5, the filter means 6 protrude partially from the housing in this rinsing position, so that the filtered material entering through the outlet side 9 in counter-current can emerge at the exposed area of the inlet side 5 and will lift off and transport away the sieve contaminations and dirt particles, respectively, being present at this inlet side 5. After the discharge of approximately 100 to 500 cm$^3$ of the filtered material, the carrier member 7 is again returned in its operating position shown in FIGS. 1 to 3, whereupon the described procedure is repeated with the other sieve means 6 or the other carrier member 7, respectively.

If interchanging of one sieve means 6 becomes necessary, the carrier member 7 is shifted beyond the position shown in FIGS. 4 to 6 into a position shown at the right-hand side of FIG. 7, in which latter position the sieve means 6 is located completely outside of the housing 1. In this position, supply of the filtered material via the rinsing passage 11 is interrupted and the inlet side 5 as well as the outlet side 9 of the sieve means 6 are pressureless, so that the sieve means can be interchanged. When doing this, the device having incorporated the filter according to the invention can still be kept in operation by means of the respective other sieve means.

What is claimed is:

1. A filter apparatus comprising:

a housing;

means for forming an inlet passage in the housing for receiving material to be filtered;

means for forming an outlet passage in the housing for discharging filtered material;

at least two carrier members, each carrier member carrying a sieve means having an inlet side and an outlet side;

means for forming a rinsing passage for each sieve means, each rinsing passage being disposed within an associated carrier member and being in fluid communication with the outlet side of its associated sieve means;

means for slidably guiding the carrier members within the housing; and means for shifting each carrier member between an operating position and a rinsing position;

wherein the inlet side of a sieve means is in fluid communication with the inlet passage and the outlet side of the sieve means is in fluid communication with the outlet passage for flowing material to be filtered from the inlet side to the outlet side of the sieve means when the carrier member associated with the sieve means is in the operating position; and wherein the rinsing passage is in fluid communication with the outlet passage for flowing filtered material from the outlet side of the sieve means toward the inlet side of the sieve means when the carrier member associated with the sieve means is in the rinsing position.

2. The filter apparatus according to claim 1 wherein the guiding means includes means for defining a recess within the housing for slidably supporting each carrier member, the recess being open on a side of the housing, and wherein the sieve means protrudes from the housing when its associated carrier member is in the rinsing position.

3. The filter apparatus according to claim 1 wherein each carrier member is shiftable beyond the rinsing position into a position in which the sieve means is wholly outside of the housing.

4. The filter apparatus according to claim 3 further comprising:
   a pressure sensor disposed within the inlet passage; and
   means, coupled to the pressure sensor and to the actuating means, for controlling the supply of pressurized fluid to each piston.

5. The filter apparatus according to claim 1 wherein the guiding means includes means for defining a recess within the housing for slidably supporting each carrier member, the recess being open on opposite sides of the housing, and further comprising:
   a piston connected to a front end of each carrier member; and
   means for actuating each piston with a pressurized fluid.

6. A filter apparatus for cleaning thermoplastic material comprising:
   a housing;
   means for forming an inlet passage in the housing for receiving material to be filtered;
   means for forming an outlet passage in the housing for discharging filtered material;
   at least two carrier members, each carrier member carrying a sieve means having an inlet side and an outlet side;
   means for forming a rinsing passage for each sieve means, each rinsing passage being disposed within an associated carrier member and being in fluid communication with the outlet side of its associated sieve means;
   means for slidably guiding the carrier members within the housing; and
   means for shifting each carrier member between an operating position and a rinsing position;
   wherein the inlet side of a sieve means is in fluid communication with the inlet passage and the outlet side of the sieve means is in fluid communication with the outlet passage for flowing material to be filtered from the inlet side to the outlet side of the sieve means when the carrier member associated with the sieve means is in the operating position; and
   wherein the rinsing passage is in fluid communication with the outlet passage for flowing filtered material from the outlet side of the sieve means toward teh inlet side of the sieve means when the carrier member associated with the sieve means is in the rinsing position.

7. A filter apparatus for cleaning thermoplastic material comprising:
   a housing;
   means for forming an inlet passage in the housing for receiving material to be filtered;
   means for forming an outlet passage in the housing for discharging filtered material;
   at least two carrier members, each carrier member removably carrying a sieve means having an inlet side and an outlet side;
   means for forming a rinsing passage for each sieve means, each rinsing passage being disposed within an associated carrier member and being in fluid communication with the outlet side of its associated sieve means;
   means for slidably guiding the carrier members within the housing;
   means for shifting each carrier member between an operating position and a rinsing position; and
   means for shifting each carrier member beyond the rinsing position so that the sieve means is disposed entirely outside of the housing;
   wherein the inlet side of a sieve means is in fluid communication with the inlet passage and the outlet side of the sieve means is in fluid communication with the outlet passage for flowing material to be filtered from the inlet side to the outlet side of the sieve means when the carrier member associated with the sieve means is in the operating position;
   wherein the rinsing passage is in fluid communication with the outlet passage for flowing filtered material from the outlet side of the sieve means toward the inlet side of the sieve means when the carrier member associated with the sieve means is in the rinsing position; and
   wherein the sieve means may be removed from its associated carrier member when the carrier member is beyond the rinsing position.

* * * * *